No. 860,937. PATENTED JULY 23, 1907.
W. C. REILLY.
MACHINE FOR RECESSING COUPLINGS.
APPLICATION FILED MAY 5, 1906.
4 SHEETS—SHEET 1.
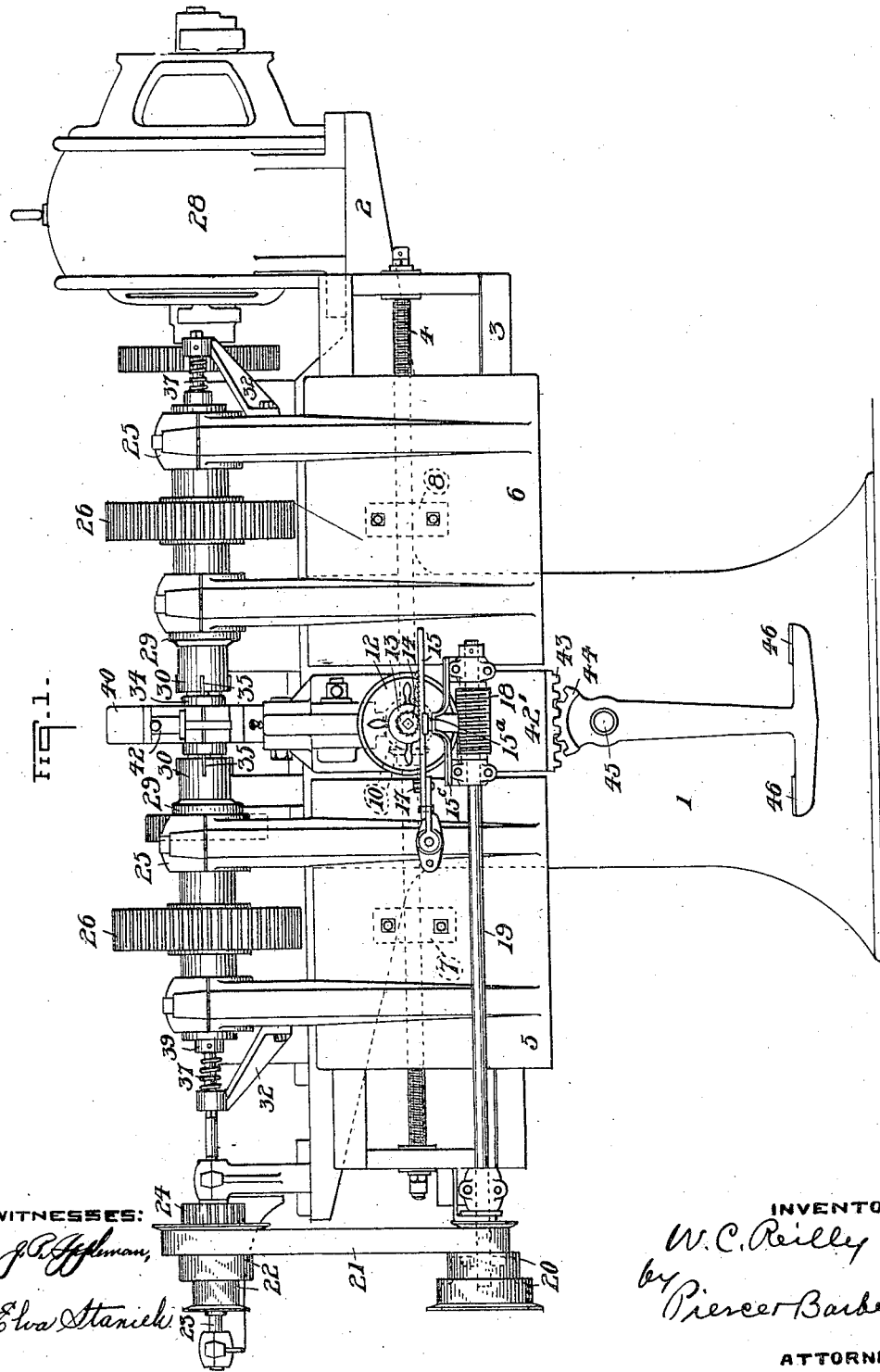
WITNESSES:
INVENTOR
W. C. Reilly
by Piercer Barber
ATTORNEYS

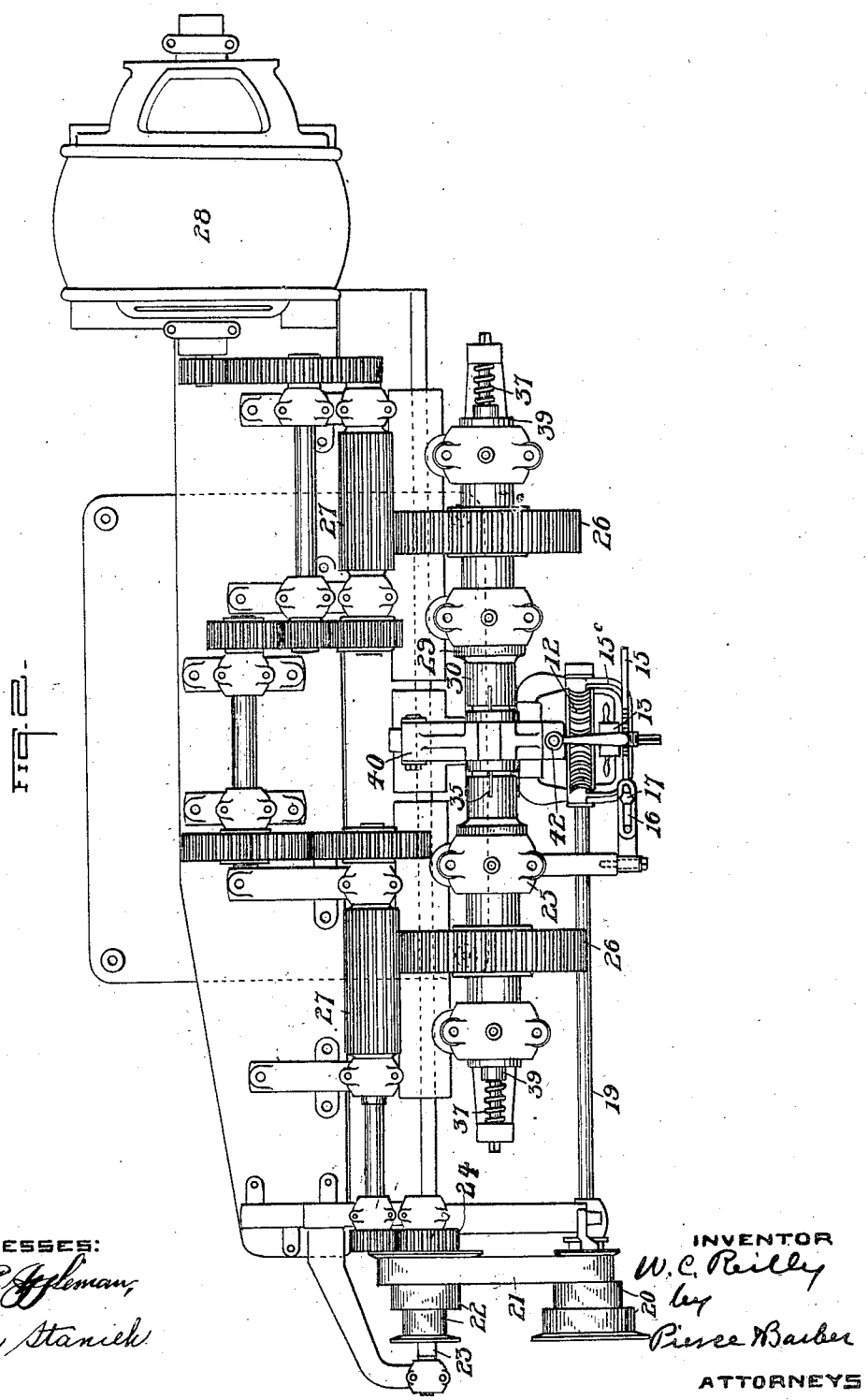

No. 860,937. PATENTED JULY 23, 1907.
W. C. REILLY.
MACHINE FOR RECESSING COUPLINGS.
APPLICATION FILED MAY 5, 1906.
4 SHEETS—SHEET 3.
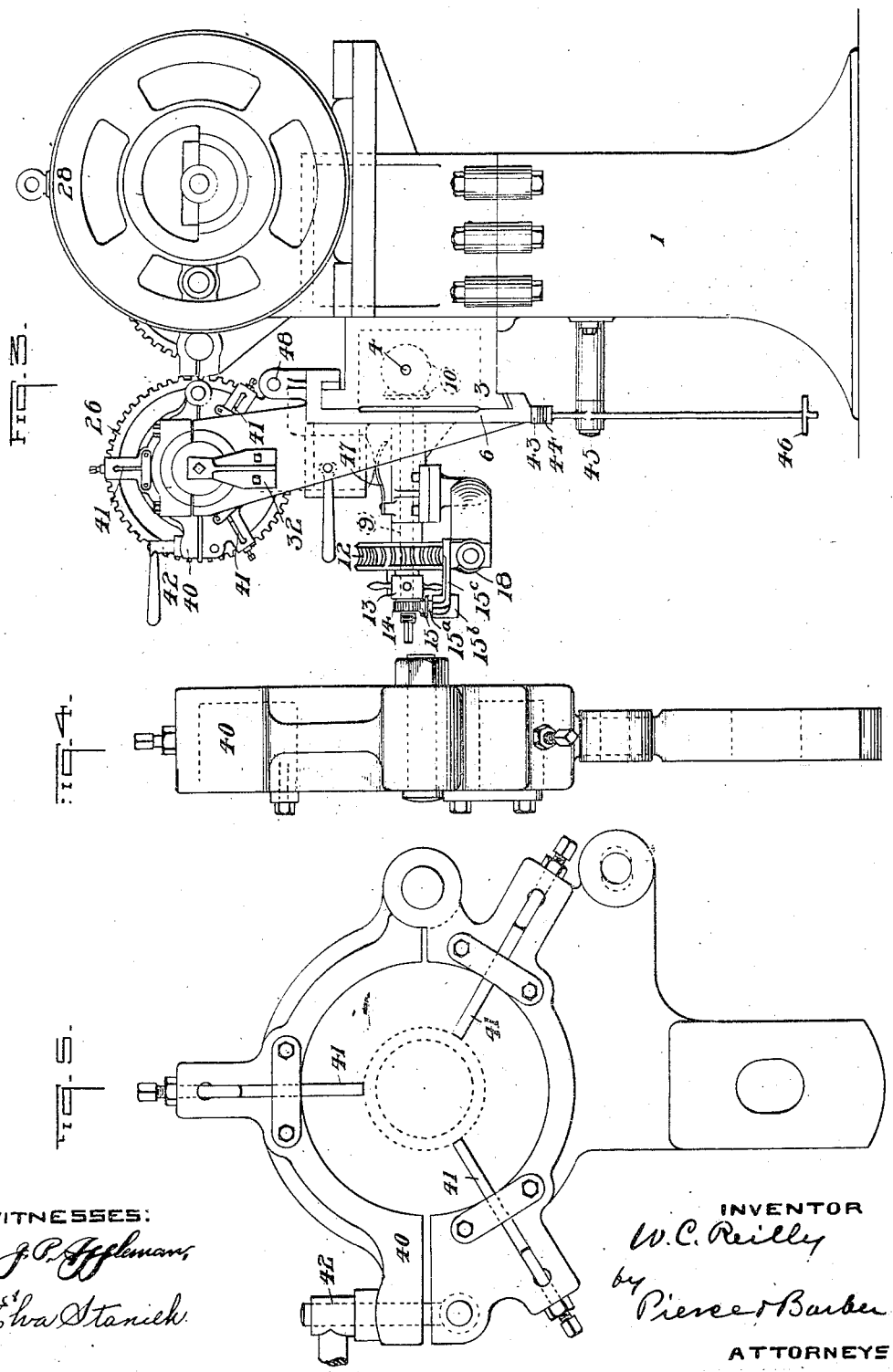
WITNESSES:
INVENTOR
W. C. Reilly
by Pierce & Barber
ATTORNEYS No. 860,937. PATENTED JULY 23, 1907.
W. C. REILLY.
MACHINE FOR RECESSING COUPLINGS.
APPLICATION FILED MAY 5, 1906.
4 SHEETS—SHEET 4.
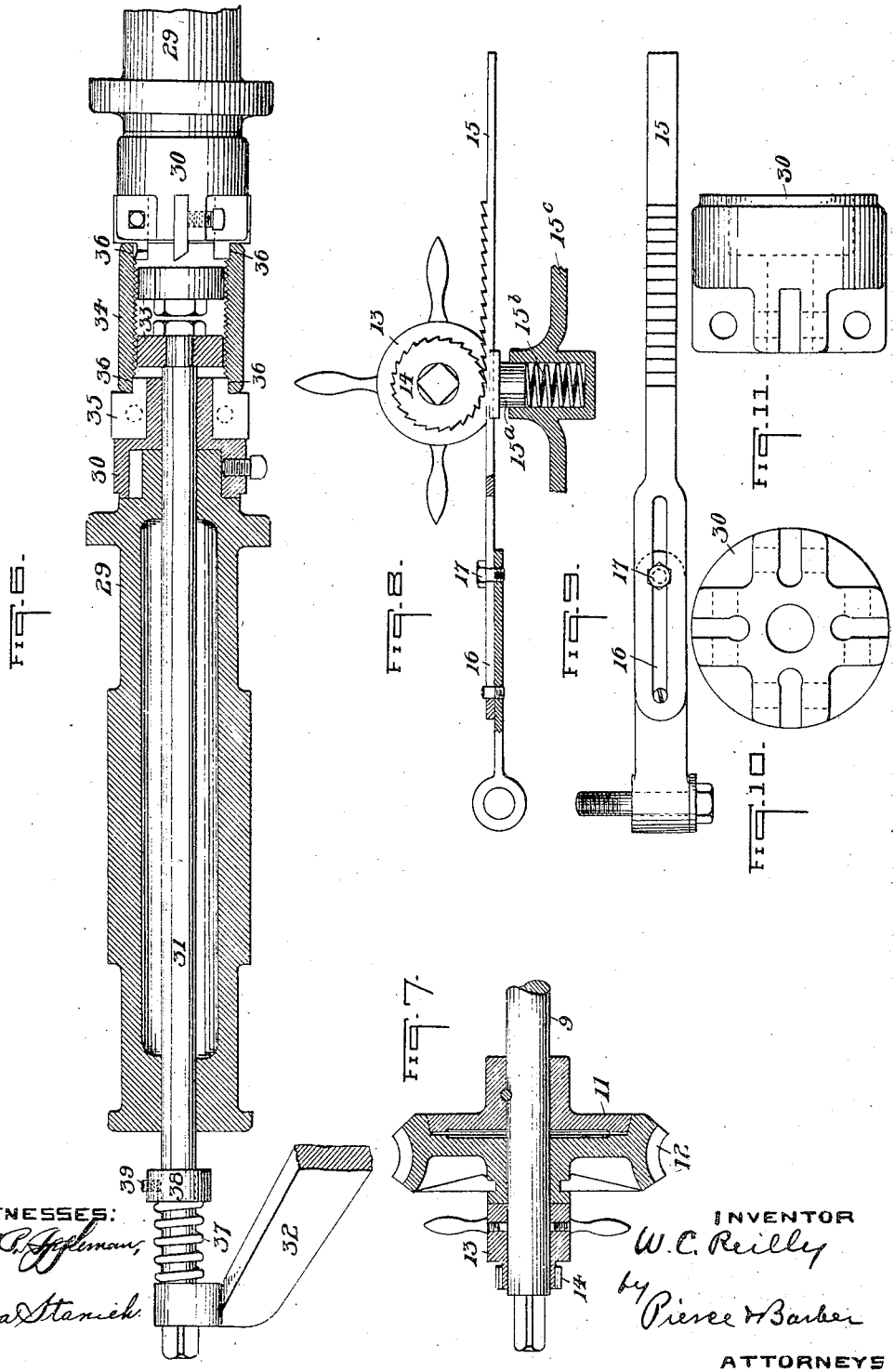

UNITED STATES PATENT OFFICE.

WILLIAM C. REILLY, OF YOUNGSTOWN, OHIO, ASSIGNOR TO YOUNGSTOWN SHEET AND TUBE COMPANY, OF YOUNGSTOWN, OHIO, A CORPORATION OF OHIO.

MACHINE FOR RECESSING COUPLINGS.

No. 860,937.

Specification of Letters Patent.

Patented July 23, 1907.

Application filed May 5, 1906. Serial No. 315,300.

*To all whom it may concern:*

Be it known that I, WILLIAM C. REILLY, a citizen of the United States, residing at Youngstown, in the county of Mahoning and State of Ohio, have invented or discovered new and useful Improvements in Machines for Recessing Couplings, of which the following is a specification.

My invention relates to machines for recessing the ends of pipe-couplings, and its object is to provide a machine which will accurately center the couplings relative to their threaded interiors while the ends thereof are being recessed. Preferably both ends of each coupling are recessed simultaneously by cutters rotating in opposite directions, whereby the couplings can be held in their chucks with the expenditure of less power.

Referring to the drawings which accompany this specification and form a part hereof, Figure 1 is a plan of my invention; Fig. 2, a front elevation; Fig. 3, an end elevation looking toward the left on Fig. 2; Fig. 4, a rear elevation of the chuck for the coupling; Fig. 5, a side elevation of the same; Fig. 6, a detail, showing partly in section the cutter chucks in working position with the coupling; Fig. 7, a detail, showing in section the worm wheel for feeding the cutter chucks and the clutch therefor; Fig. 8, a detail partly in section, showing the clutch releasing mechanism; Fig. 9, a plan of the shifting bar for operating the said clutch; Fig. 10, an end view of one of the cutter holders; and Fig. 11, a side view of the same.

On the drawings, 1 is the leg or base, upon which the gear table 2 rests. The table 2 supports along its front the guide 3, which is an open frame, having the lead-screw 4, journaled in its ends, the screw having one end with right-hand threads and the other end with left-hand threads. The two mandrel-saddles 5 and 6 are slidable on the front of the guide 3, saddles 5 and 6 having secured thereto the nuts 7 and 8, respectively, the former nut coöperating with the screw threads on the left-hand end of the screw 4 and the latter nut, with the threads on the other end of the screw. The lead-screw 4 is operated by the shaft 9 through the bevel-gearing 10. The shaft has keyed thereto the friction disk 11, which coöperates with the face of the worm-wheel 12, loose on the shaft 9 and which is forced against the disk 11 by the hand-operated nut 13 working on the said shaft and against the worm-wheel. The nut 13 is provided with the circle of teeth 14, which point in the direction of the rotation of the nut when turned to clamp the worm-wheel and the friction disk together, the teeth meshing with similarly-shaped teeth of the rack bar 15, carried by the mandrel-saddle 5. The bar 15 is made of two sections, adjustably secured together by the pin and slot connection, one section containing the slot 16 while the other contains the pin 17 which is adjustable along said slot and secured in any selected adjustment by a nut on the pin clamping the two sections together. The rack-bar 15 is supported on the rest 15$^a$ seated on the spring 15$^b$ in a socket in the bracket 15$^c$.

The worm-wheel 12 is driven by the worm 18 on the shaft 19 provided with the pulleys 20, connected by the belt 21 to the pulleys 22 on the shaft 23, which also carries the spur-gear 24.

The boring mandrels 29 are supported in the bearings 25 on the mandrel-saddles 5 and 6 and are provided with the spur-gears 26, meshing with the barrel-pinions 27, along which they slide as the mandrel-saddles move along the guide 3. The pinions 27 are driven through any desired gearing by the motor 28, which through intermediate connections drives the gear-wheel 24. The boring mandrels 29 are each provided with the cutter-chuck 30 at their opposing ends, and also with a centering device for centering the coupling true with the thread, which has been cut therein. This device consists of a spindle or rod 31 housed in the mandrel in such a manner that it can slide endwise and is prevented from turning by having its outer end square and housed in the bracket 32 carried by the mandrel-saddle and having a square opening to fit the square end of the spindle.

Each spindle has its inner end provided with the centering disk 33 which is of the proper diameter to fit the inside of the coupling at such a distance from the end of the coupling 34 that it will be out of the way of the recessing cutter 35, when the proper length of the recess 36 has been cut in the coupling. Each spindle 31 is provided with the spring 37 which bears against the bracket 32 and the collar 38 adjustable on the spindle by the set-screw 39. The office of the spring and the collar is to prevent the damaging of the threads in the coupling after it has been centered by the disk 33 and while the boring mandrel is moving toward the coupling. The centering disks remain stationary after engaging the inwardly tapering interior of the coupling while the boring mandrels move relatively to the disks. Owing to the tapering opening the disks could not move toward each other after engaging the threads without damaging them. The springs 37 are compressed by the brackets 32 as they travel toward the coupling. When the boring mandrels are withdrawn, the springs keep the centering spindles toward the finished coupling 34 far enough to permit the centering disks to enter a new coupling far enough in advance of the cutters 35 to center the new coupling before the cutters engage it.

The coupling is clamped tight in the chuck 40 by means of the radially adjusted dogs 41, the chuck being in two hinged sections secured together by the handnut 42. The chuck is carried by the chuck-saddle 42, slidable on the guide 3 between the mandrel-saddles 5 and 6, by means of the rack 43 thereon and the pivoted rack 44 meshing therewith. The rack 44 is pivoted at 45 on the front of the leg 1 and has the lateral lugs 46, adapted for engagement by the operator's feet to move the chuck-saddle to the right or the left after the coupling has been clamped in the chuck in order that the coupling may be centered between the cutters whereby the latter may commence to work on the ends of the coupling simultaneously.

The chuck 40 rests on the flat steel spring 47 so that it can be raised or lowered when centering an untrue coupling. The chuck also has lateral movement on the pin 48 for the same purpose.

The chucks which hold the couplings and the centering disks 33 must be changed for each size of coupling. The cutter-chucks will also have to be changed to suit the different sizes of couplings.

I claim—

1. In a machine for recessing couplings, a coupling chuck having a limited universal movement transversely of the coupling, a rotary cutter for recessing an end of the same, and means concentric with the axis of the cutter, insertible within the chucked coupling, and engageable with the interior surface of the coupling whereby the axis of the coupling may be set in line with the axis of the cutter.

2. In a machine for recessing couplings, a cutter for recessing an end of a coupling, a chuck for holding the coupling, a spring support for the chuck and a coupling secured therein, the arrangement being such that the chucked coupling is, by said spring, held with its axis approximately in line with the axis of the cutter, and means, concentric with the axis of the cutter and movable into engagement with the interior wall of the coupling, for moving said chuck and coupling so that the axis of the coupling and cutter shall be in alinement.

3. In a machine for recessing the ends of couplings, means for yieldingly holding the couplings, a rotary cutter to recess the end of the coupling, means for feeding the cutter toward the coupling, a centering device for said coupling lying in the axis of the cutter and having its end nearest the coupling enlarged to engage the interior of the same, and means permitting the centering device to remain stationary after the coupling has been centered and while the cutter is recessing the coupling.

4. In a machine for recessing the ends of couplings, a rotary cutter to recess the end of a coupling, means including a clutch for feeding the cutter toward the coupling, a nut to hold the clutch in operation, teeth on said nut and a rack in engagement with said teeth, and means arranged to be controlled by the position of the cutter for causing said rack to rotate said nut to release said clutch.

5. In a machine for recessing couplings, a chuck for holding a coupling, a rotary cutter for recessing an end of the coupling, a carriage supporting the cutter and movable toward and from the chuck, a rotary shaft operatively connected to said carriage to move the same as described, a clutch member on said shaft, a second clutch member, means for driving the latter member, a nut on said shaft for drawing the clutch members into contact, a rack bar on said carriage, engageable with rack teeth on said nut, and yieldable means for holding said nut and bar in engagement, whereby the said bar may, when moving in one direction, rotate said nut to release the clutch members and when moving in the other direction, may move in the opposite direction without rotating said nut.

6. In a machine for recessing couplings, a reciprocating carriage, a recessing cutter supported thereon, a pair of clutch members for reciprocating said carriage, a nut adapted to draw said clutch members together and provided with teeth slanting in the direction of rotation of said nut when so drawing said members, a bar secured to said carriage, having teeth meshing with the teeth on the nut, and means for holding the bar yieldingly against the teeth on the nut.

Signed at Youngstown, Ohio, this 30th day of April, 1906.

WILLIAM C. REILLY.

Witnesses:
ARTHUR R. FOSTER,
R. M. WELCH.